Aug. 23, 1966

P. GUYOT 3,268,366

PHOTO-ELECTRIC CELL

Filed Aug. 31, 1962

INVENTOR
PAUL GUYOT

BY
Frank R. Jeifani
AGENT

United States Patent Office 3,268,366
Patented August 23, 1966

3,268,366
PHOTO-ELECTRIC CELL

Paul Guyot, Caen, France, assignor to North American Philips Company, Inc., New York, N.Y., a corporation of Delaware Filed Aug. 31, 1962, Ser. No. 220,596
5 Claims. (Cl. 136—89)

The present invention relates to a photo-electric cell, for instance a solar cell comprising photo-sensitive elements, for instance elements sensitive to sunrays and specially so-called "photo-voltaic" elements which, as is known, are capable of causing electric current to flow in a load circuit without the use of a generator or auxiliary source of electric voltage when they are struck by radiation of a suitable spectrum and sufficient intensity. These known elements may, for example, be of the type proposed by Chapin, Fuller and Pearsons, which is constituted by pn junctions in semi-conductor silicon.

According to the present invention, in a photo-electric cell a certain number of identical elements may be arranged in series, in parallel or in series parallel connection in a case or on a base which at the same time ensures their location in the required positions, their exposure to exciting incident radiation, the dissipation of at least part of the heat produced by this radiation and finally absolute tightness of the whole. Thus there are obtained photo-electric cells consisting of groups of photo-sensitive elements, specially photo-voltaic elements, capable of supplying a substantially constant power to a particular load circuit when they are excited by suitable radiation. The said photo-electric cells may in turn be associated in any number in series, parallel arrangements to form a photo-sensitive device, for instance a photo-voltaic battery in which the cells are interchangeable.

According to a preferred embodiment of the invention, the elements are disposed in apertures of a mounting grid so as to facilitate as far as possible their connections, which may be effected by any known means, especially with the aid of printed circuits or by soldering. The said grid, the thickness of which slightly exceeds that of the elements, is made of a flexible and elastic insulating material which within certain limits is resistant to heat. An example of such a material is an epoxy resin or an elastomer.

According to another preferred embodiment of the invention, the said grid provided with its elements is disposed between a transparent window covering the sensitive surface of the elements and a metal base provided with cooling ribs or fins and coated with a very thin insulating layer. The super-position of the said three members: base, grid with elements and covering window, forms a photo-electric cell and these members may be united to form an integral unit by a peripheral profiled strip which encircles them and after being crimped covers their edges.

The following description with reference to the accompanying drawing, given by way of non-limitative example, will make clear how the invention may be carried into effect, the details following both from the drawing and from the text obviously forming part of the said invention.

Figure 5:
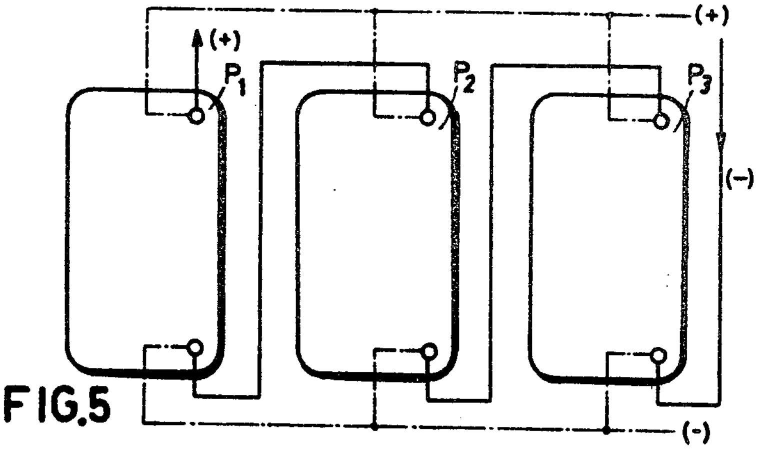

FIG. 5 finally shows an example of a combination of identical cells arranged either in series or in parallel on a same panel.

Figures 1, 2, 3:
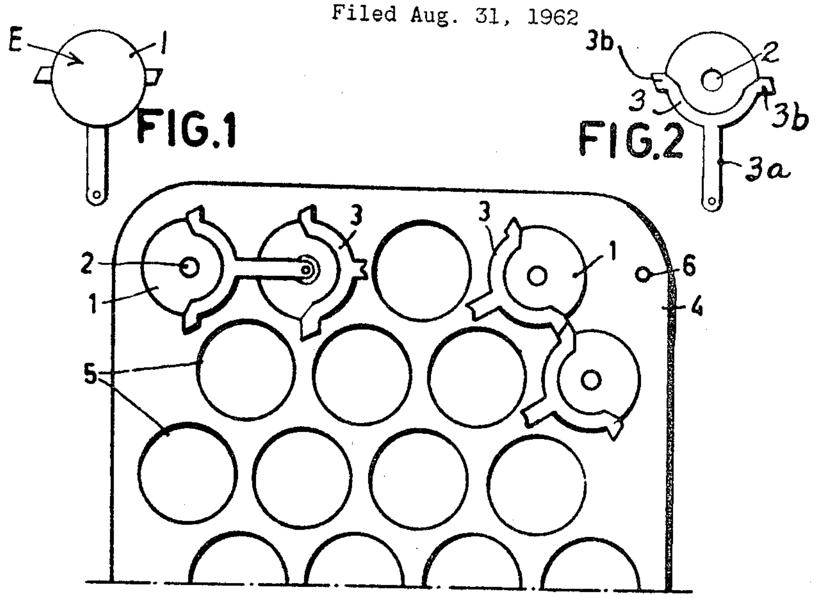
FIG. 1 is a plan view of that surface of a photo-voltaic element which is sensitive to incident radiation.
FIG. 2 is an underside plan view of the same element and shows the disposition of the electrodes.
FIG. 3 shows part of the grid for accommodating elements identical with that shown in FIGS. 1 and 2.

As has been mentioned hereinbefore, the photo-sensitive element shown in FIGS. 1 and 2 consists mainly of a semi-conductive wafer 1 of n-type silicon carrying a central electrode 2 surrounded by a peripheral electrode 3 from which it is insulated. The semi-conductor wafer is coated with a thin layer of boron-doped p-type silicon the thickness of which corresponds to a fraction of the wavelength (being somewhat of the order of a micron) of the radiation to which the element is most sensitive. The peripheral electrode 3 is provided with a radial projection *3a* and two smaller lateral projections *3b*. The former projection serves to facilitate the connections for series arrangement (left-hand side of FIG. 3) and the latter projections serve to facilitate the connection for parallel arrangement (right-hand side of FIG. 3) of several elements disposed in the grid of the same photo-electric cell.

Part of this grid, a plan view of the surface of which engaging the base or lower surface is shown in FIG. 3, substantially comprises a foil 4 of a flexible and elastic insulating material capable of withstanding the heat conveyed by the incident radiation and accumulated by the cell during prolonged exposure to this radiation. It is provided with apertures or holes 5 which form chambers in which the photo-sensitive elements are embedded so that only the projections *3a* and *3b* project beyond the lower surface. Each grid may be adapted to accommodate an arbitrary number of such elements. For instance a photo-electric cell has been made having $4\times9=36$ identical elements. The grid shown in FIG. 3 is also provided with at least two apertures 6 of smaller diameter through which leads connecting the elements to the terminals of the cell may pass.

Figure 4:
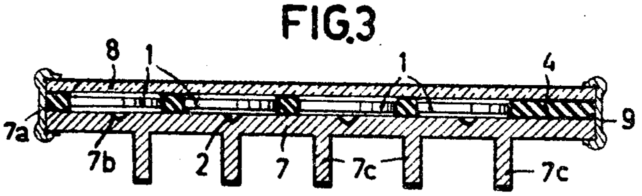
FIG. 4 is a cross-sectional view of a group of elements mounted in the same grid and arranged on a same base so as to form a photo-voltaic cell.

As FIG. 4 shows in cross-section, a complete cell comprises a base 7 on which is placed a grid 4 provided with photo-sensitive elements 1 which grid is covered by a transparent window 8. The whole is united with the aid of a profiled peripheral strip 9 which is first butt-welded and then crimped so that its marginal parts engage the edges of the outer faces of the base 7 and of the window 8. Due to the elasticity of the grid 4 the pressure produced by the crimping of the strip 9 is sufficient to provide a completely tight peripheral joint. For this purpose a ridge *7a* is provided along the circumference of the inner surface of the base 7. This surface is also provided with recesses *7b* opposite the centre of each chamber of the grid to be located thereon in order to leave space which may be occupied by a soldered connection with the central electrode 2 of each element. On its opposite or outer surface the base 7 has a certain number of fins *7c* of sufficient height to perform the function of cooling ribs.

The base may be made by any known means and especially by the conventional techniques of casting, pressing, etc., from a metal or alloy which is as light as possible and possesses satisfactory thermal conductivity and sufficient mechanical strength. It is preferably provided with apertures corresponding to the apertures 6 of the grid in order to permit the passage of leads to the external connections of the cell through a glass bead sealed to the metal so as to ensure insulation and tightness. Further it is coated with a thin insulating layer which suffices to prevent shortcircuiting of the electrodes of the elements through their contacts with the base but does not suffice to produce an appreciable thermal insulation between the various parts.

In a practical embodiment of an experimental cell the base 7 was made from an aluminum alloy by coating in moulds, machining throughout its surface area and superficially insulating by anodic oxidation and giving a dull black colour (in order to increase its thermal radiation to a maximum).

The above-described batteries may be combined for operation in any known manner.

FIG. 5 shows a photo-voltaic battery composed of identical cells $P_1$, $P_2$ and $P_3$ disposed side by side on a panel. In this figure the connections shown by full lines show the series arrangement while the connections shown in broken lines show the parallel arrangement. It should be understood that neither the dimensions of each cell nor the number of cells mounted on the same panel have a limitative character.

It is obvious that modifications may be made in the embodiments described, especially by substituting equivalent technical means, without departing from the scope of the present invention. In particular the window 8 may be made either from glass or from any other transparent material and especially from "Plexiglas" (polymethylmethacrylate). However, a material the transparency of which is a maximum for the wave-length of the radiation to which the photo-sensitive elements are most sensitive will preferably be chosen.

What is claimed is:

1. A photoelectric panel device comprising plural, individual photoelectric cells each containing a pair of electrodes and having one side adapted to receive radiation, means for holding and supporting said cells comprising a metal base member of extended surface area and on said base a generally planar insulative member containing plural apertures passing completely therethrough, each of said cells being disposed in one of said apertures with the radiation-receiving sides all facing in a direction opposite to the base, means interconnecting each electrode of each pair associated with each cell to at least one other electrode of an adjacent cell, whereby all the cells are connected in one of series, parallel, and series-parallel arrangement, and a radiation-transparent window member mounted over the apertured member and holding the cells in position within the apertures.

2. A device as set forth in claim 1 wherein said apertured member is constituted of a flexible, elastic, electrically-insulating material, and the base member is provided with cooling projections.

3. A solar cell panel device comprising plural, individual photoelectric solar cells each containing a pair of spaced electrodes on one side and having the opposite side adapted to receive radiation, means for holding and supporting said cells comprising a metal base member of extended surface area and on said base a generally planar member containing plural spaced apertures passing completely therethrough, said apertured member being constituted of a flexible, elastic, electrically-insulating material, each of said cells being disposed in one of said apertures with the radiation-receiving sides all facing in a direction opposite to the base, means interconnecting each electrode of each pair associated with each cell to at least one other electrode of an adjacent cell, whereby all the cells are connected in one of series, parallel, and series-parallel arrangement, a radiation-transparent window member mounted over the apertured member and holding the cells in position within the apertures, and means for clamping the base, apertured member and window member together.

4. A panel device as set forth in claim 3 wherein the clamping means clamps the edges of the three members together, and a thin insulating layer is provided on the base underneath the electrodes.

5. A device as set forth in claim 3 wherein the electrodes for each cell comprise a first center electrode and a second annular electrode along the cell edge with two short projecting portions at the ends and one long projecting portion at the center, said projecting portions having lengths such that the short projecting portions on adjacent devices contact one another when the devices are oriented in one position and such that the long projecting portion contacts the center electrode of an adjacent device when the devices are oriented in a different position.

References Cited by the Examiner

UNITED STATES PATENTS

| | | | |
|---|---|---|---|
| 2,780,765 | 2/1957 | Chapin et al. | 136—89 |
| 2,794,846 | 6/1957 | Fuller | 136—89 |
| 2,919,298 | 12/1959 | Regnier et al. | 136—89 |
| 3,025,335 | 3/1962 | Ralph | 136—89 |
| 3,038,952 | 6/1962 | Ralph | 136—89 |

OTHER REFERENCES

Chapin, D. M., Fuller, C. S., and Pearson, G. L.: "A New Silicon p-n Junction Photocell for Converting Solar Radiation into Electrical Power." In "Journal of Applied Physics," vol. 25, 1952, pp. 676–677.

WINSTON A. DOUGLAS, *Primary Examiner.*

JOHN H. MACK, *Examiner.*

A. M. BEKELMAN, ALLEN B. CURTIS, *Assistant Examiners.*